(12) United States Patent
Turner et al.

(10) Patent No.: US 8,981,909 B2
(45) Date of Patent: Mar. 17, 2015

(54) RFID GROUP SELECTION METHOD

(75) Inventors: Christopher Gordon Gervase Turner, Bucks (GB); John McMurray, Gauteng (ZA)

(73) Assignee: ZIH Corp., Lincolnshire, IL (US)

( * ) Notice: Subject to any disclaimer, the term of this patent is extended or adjusted under 35 U.S.C. 154(b) by 1401 days.

(21) Appl. No.: 10/597,725

(22) PCT Filed: Feb. 2, 2005

(86) PCT No.: PCT/GB2005/000345
§ 371 (c)(1),
(2), (4) Date: Aug. 3, 2007

(87) PCT Pub. No.: WO2005/078633
PCT Pub. Date: Aug. 25, 2005

(65) Prior Publication Data
US 2008/0018431 A1    Jan. 24, 2008

(30) Foreign Application Priority Data

Feb. 6, 2004 (GB) .................................. 0402667.0

(51) Int. Cl.
*H04Q 5/22* (2006.01)
*G06K 7/10* (2006.01)
*G06K 7/00* (2006.01)

(52) U.S. Cl.
CPC .......... *G06K 7/10108* (2013.01); *G06K 7/0008* (2013.01)
USPC .................. 340/10.32; 340/10.33; 340/10.34

(58) Field of Classification Search
USPC .................. 340/1.1, 10.1–10.6, 572.1–572.9; 235/375–385
See application file for complete search history.

(56) References Cited

U.S. PATENT DOCUMENTS

| | | | |
|---|---|---|---|
| 5,231,273 A * | 7/1993 | Caswell et al. | ............... 235/385 |
| 5,528,232 A | 6/1996 | Verma et al. | |
| 5,537,105 A | 7/1996 | Marsh et al. | |
| 5,550,547 A | 8/1996 | Chan et al. | |
| 5,557,280 A | 9/1996 | Marsh et al. | |
| 5,640,151 A | 6/1997 | Reis et al. | |

(Continued)

FOREIGN PATENT DOCUMENTS

| EP | 0 467 036 B1 | 2/1996 |
|---|---|---|
| EP | 0702323 A2 | 3/1996 |

(Continued)

OTHER PUBLICATIONS

International Search Report for International Application No. PCTGB2005/000345, completed on May 4, 2005.

(Continued)

*Primary Examiner* — James Yang
(74) *Attorney, Agent, or Firm* — Alston & Bird LLP (57) ABSTRACT

The invention describes a selection and arbitration method for reading a population of RFID transponders (tags). The transponders are selected or de-selected individually, or in one or more groups, using one or more command signals from a reader. The command signals from the reader include selection or de-selection criteria for selecting or de-selecting transponders by moving them between different states by setting or resetting a command flag, such as a flip-flop, in the transponders. The different transitional states include a Ready state, an Active state, a Standby state, a Singulated state and a Quiet state.

49 Claims, 8 Drawing Sheets (56) References Cited

U.S. PATENT DOCUMENTS

| | | | |
|---|---|---|---|
| 5,673,037 | A | 9/1997 | Cesar et al. |
| 5,686,902 | A | 11/1997 | Reis et al. |
| 5,699,066 | A | 12/1997 | Marsh et al. |
| 5,887,176 | A * | 3/1999 | Griffith et al. ............... 713/320 |
| 5,942,987 | A | 8/1999 | Heinrich et al. |
| 5,973,613 | A | 10/1999 | Reis et al. |
| 6,040,773 | A | 3/2000 | Vega et al. |
| 6,054,925 | A | 4/2000 | Proctor et al. |
| 6,094,138 | A | 7/2000 | Eberhardt et al. |
| 6,104,279 | A | 8/2000 | Maletsky |
| 6,104,333 | A | 8/2000 | Wood, Jr. |
| 6,107,921 | A | 8/2000 | Eberhardt et al. |
| 6,130,613 | A | 10/2000 | Eberhardt et al. |
| 6,147,605 | A | 11/2000 | Vega et al. |
| 6,154,136 | A | 11/2000 | Van Eeden |
| 6,172,608 | B1 | 1/2001 | Cole |
| 6,236,316 | B1 | 5/2001 | Eberhardt et al. |
| 6,252,508 | B1 | 6/2001 | Vega et al. |
| 6,259,369 | B1 | 7/2001 | Monico |
| 6,265,977 | B1 | 7/2001 | Vega et al. |
| 6,483,426 | B1 | 11/2002 | Pagnol et al. |
| 6,549,064 | B2 * | 4/2003 | Bandy et al. ............... 327/536 |
| 6,611,199 | B1 | 8/2003 | Geiszler et al. |
| 6,812,852 | B1 | 11/2004 | Cesar |
| 6,816,076 | B2 | 11/2004 | Pomes |
| 6,870,733 | B2 | 3/2005 | Castell et al. |
| 6,880,050 | B1 * | 4/2005 | Korger ............... 711/156 |
| 7,132,947 | B2 * | 11/2006 | Clifford et al. ............ 340/572.3 |
| 7,176,797 | B2 * | 2/2007 | Zai et al. ............... 340/572.1 |
| 7,253,736 | B2 | 8/2007 | Tethrake et al. |
| 2002/0024422 | A1 * | 2/2002 | Turner et al. ............... 340/10.3 |
| 2003/0067414 | A1 | 4/2003 | Cole et al. |
| 2005/0284941 | A1 | 12/2005 | Lubow |

FOREIGN PATENT DOCUMENTS

| | | |
|---|---|---|
| EP | 702323 A2 * | 3/1996 |
| EP | 0924635 A2 | 6/1999 |
| EP | 0 983 569 | 9/2003 |
| FR | 2 736 449 | 1/1997 |
| GB | 2 202 981 | 10/1988 |
| WO | WO 97/01826 | 1/1997 |
| WO | WO-98/52142 A1 | 11/1998 |
| WO | WO 99/26081 | 5/1999 |
| WO | WO-01/24109 A1 | 4/2001 |
| WO | WO-02/095674 A1 | 11/2002 |
| WO | WO-03/102713 A2 | 12/2003 |

OTHER PUBLICATIONS

Written Opinion for International Application No. PCT/GB2005/000345, completed on May 13, 2005.
Office Action from Chinese Patent Application No. 201110084957.5, dated Feb. 2, 2012.
Combined Search and Examination Report for United Kingdom Application No. 0900918.4; dated Feb. 2, 2009.
"*Draft protocol specification for a 900 MHz Class 0 Radio Frequency Identification Tag;*" Auto-ID Center; dated Feb. 23, 2003.
Examination Report for United Kingdom Application No. GB 0402667.0; dated Jun. 23, 2008.
Examination Report for United Kingdom Application No. GB 0900918.4; dated Jul. 16, 2009.
International Preliminary Report on Patentability for Application No. PCT/GB2005/000345; dated Aug. 7, 2006.
Office Action for Chinese Application No. 200580008811.5; dated Mar. 28, 2008.
Office Action for Chinese Application No. 200580008811.5; dated May 10, 2010.
Office Action for Chinese Application No. 200580008811.5; Notice of Allowance; dated Jan. 18, 2011.
Office Action for Chinese Application No. 201110084957.5; dated Jan. 4, 2013.
Search Report for United Kingdom Application No. GB 0402667.0; dated Jul. 26, 2004.

* cited by examiner

| Command | parameters | | | | |
|---|---|---|---|---|---|
| Reset | | | | | |
| Query | Select | | | | |
| Select | Exclude | New | Ptr | Mask Length | Mask |
| Connect | | | Ptr | Mask Length | Mask |
| Ack | Argument | | | | |
| Singulate | Argument | | | | |

| State | Description | Commands to which responsive |
|---|---|---|
| RF FIELD OFF | The Tag is out of the RF field or the Reader Tx Carrier is switched off for longer than 300µS @ 25°C. | None. |
| READY | The Tag is in an RF field, its clock is running and it is waiting for a *Query* command to enable its participate in Arbitration. | *Query* (Select) & S<br>*Query* (~Select) & ~S |
| ACTIVE | The Tag steps its internal hold-off circuitry and will transmit if it has reached its turn to transmit. | Responsive to all Arbitration commands. |
| STANDBY | ACTIVE state is suspended. The tags internal hold-off circuitry has stopped stepping. When exiting this state due to any of the Arbitration commands listed on the right the tag will immediately resume stepping its internal hold_off and retry. | *Round_Size* (~Select) & ~S<br>*Round_Size* (~Select) & ~S<br>*Query* (~Select) & ~S<br>*Query* (~Select) & ~S<br>*Ack* (Member) |
| SINGULATED | The Tag has been singulated by a *Singulate* command with valid acknowledge values or by a *Dialogue* command. The Tag can process *Read_Blocks* or *Write_Block* Dialogue commands. | All commands. *Reset* will move Tag to the READY state, all other Arbitration commands will move the Tag to the QUIET state. The *Read_Blocks* command will read the number of blocks specified as a command parameter and will leave the Tag in the SINGULATED state. The *Write_Block* command will write 32 bit data to the block specified as a command parameter and will leave the Tag in SINGULATED state. The *Dialogue* command will move the Tag to the QUIET state if the Mask in the command does not match the tags data, or will leave the Tag in SINGULATED state if the Mask matches. |
| QUIET (Persistent Sleep) | Tag is not responsive to any Arbitration commands except Reset. It can only return to active population after being removed from the RF field for an extended period of time typically greater than 2 seconds or on receiving a *Reset* command – either of these being followed by a *Query* command. This QUIET state will be maintained in the absense of RF power for at least 2 seconds. | *Reset* |

Fig.6.

| Reader Command | Tag Operation |
|---|---|
| Reset | Moves the Tag from any current state to READY state. |
| Query | This command initialise the start of the arbitration sequence and tells Tag over how many internally timed slots to randomise the transmit slot selection. The Tag chooses its response slot. If the Select bit in the command set and the tag's internal "S" flag is set, or if the Select bit in the command is clear and the tag's internal "S" flag is clear this command causes the Tag to move from the READY to the ACTIVE state or from the STANDBY to the ACTIVE state. If the tag has moved to the ACTIVE state and has chosen the 1st internally timed slot as its Response slot, the Tag will send its Response to the Reader immediately after receiving this command. |
| Round_Size | Causes the Tag to change the number of pseudo-slots over which it randomises its transmissions if it is in the ACTIVE state. The Tag chooses its Response slot number. Tags in the READY state will ignore this command. If the Tag is in the ACTIVE state and has chosen the 1st slot as its Response slot, the Tag will send its Response to the Reader. If the Tag is in the STANDBY state and has chosen the 1st slot as its Response slot, the Tag will send its Response to the Reader. |
| Select | |
| Connect | |
| Ack | Acknowledges the successful reception of a Tag transmission by the Reader when valid ie. when received by a Tag which has just transmitted, and when the command is received in the timing window and when the Signature matches that sent by the tag in its Response, causing the Tag to move from the ACTIVE to the QUIET state. Causes a Tag in the STANDBY state to move to the ACTIVE state if its Member flag is set. |
| Singulate | Acknowledges the successful reception of a Tag transmission by the Reader when valid ie. when received by a Tag which has just transmitted, and when the command is received in the timing window and when the Signature matches that sent by the tag in its Response, causing the Tag to move from the ACTIVE to the SINGULATED state. Causes all other the Tags in the active population to move to the STANDBY state. In this state the Tag is singulated and the Reader can communicate with it using Dialogue commands with the rest of the tags that were in the active population move to the STANDBY state…, in which they will remain until they detect any Arbitration command (with matching selection criteria for Begin_Round, Init_Round and FST_Round commands). If a valid Arbitration command is received, these Tags will move from the STANDBY state to the ACTIVE state. If a Begin_Round, Init_Round or FST_Round command is received with a mismatch in its selection arguments, these Tags will move from the STANDBY state to the READY state. |
| *Mute – this is not an actual command but is an implied command derived from the first low-going pulse of any command.* | The Tag will move to the STANDBY state upon reception of the first low-going pulse of any command. This could be any single pulse or the first pulse of the SOF of a valid command. The Tag will continue to decode the command and if the pulse turns out to be part of a valid command, the Tag respond as described for the particular command in this table. as follows: a) If the tag received a *Reset* command it will move to the READY state, b) If the tag received a Round_Size, Query of Select command and the it will move to the READY state, or the ACTIVE state depending on the actual command and the command parameters. |

Fig.7.

| Reader Command | Conditions | Tag Response |
|---|---|---|
| Select | Exclude bit = 0<br>New bit = 0 | The 'S' flag in the tag is set if the mask matches the relevant portion of the tag data memory. The 'S' flag will be reset if there is no match |
| | Exclude bit = 1<br>New bit = 0 | The 'S' flag in the tag will be reset if the mask matches. If the mask matches. If the mask does not match, then the flag will remain in its previous condition. |
| | Exclude bit = any value<br>New bit = 1 | This causes a fresh selection process to take place. The tags matching the mask will have their 'S' flag set or reset according to the value of the Exclude bit and will over-ride any previously selected condition. This command may be used to take an new inventory of tags which have already undergone an inventory but are remain in the reader field. |

Fig. 8.

RFID GROUP SELECTION METHOD

FIELD OF INVENTION

The present invention relates to a selection and arbitration method, more particularly, but not exclusively, to a method, system and selection mechanism for reading a population of RFID transponders (tags). The invention also relates to a method of identifying a plurality of transponders each of which transmits data at intervals to an interrogator (receiver), and to an identification system comprising a plurality of transponders and a receiver, to the transponders themselves and to an integrated circuit for use in a transponder.

BACKGROUND TO THE INVENTION

Identification systems are known in which a plurality of transmitters, typically transponders (commonly called tags), are activated by a power signal (or an "interrogation signal") and then transmit signals, usually containing identification data to a receiver, which typically forms part of the interrogator. The signals may be transmitted in many ways, including electromagnetic energy, eg. radio frequency (RF), infra red (IR), coherent light and sound, eg. ultra-sound. For example the transmission may be achieved by actual emission of RF energy by the transponders, or by the modulation of the reflectivity of an antenna of the transponder, resulting in varying amounts of RF energy in the interrogation signal being reflected or back-scattered from the transponder antenna.

Radio Frequency Identification systems are used to remotely identify, take a census of, locate or otherwise interact with people, objects or groups or clusters of people or objects. The systems usually comprise interrogators also known as readers, and transponders also known as tags.

It is not usually a problem for a reader to communicate with a single tag which is presented to the reader, such as in an access control system. However in the situation where many tags may be present in a reader's field of views, such as a crowd of people, or a pallet load of goods having tags attached, the transmissions by the tags would occur together and cause collisions, rendering the transmissions unusable due to mutual interference. A number of arbitration methods have been developed to enable a reader to sort and/or isolate and transact with these large populations of tags. These methods are known variously as anti-collision schemes or collision-arbitration algorithms.

In one example described in U.S. Pat. No. 5,537,105 (corresponding to EP 494114 B1) by Marsh et al, the whole contents of which are incorporated herein, the transponders on receipt of an interrogation signal repeatedly transmit a response signal containing data which identifies the transponder. The interrogator detects successful identification of any transponder and briefly modifies the interrogation signal to indicate the successful identification. Each transponder includes a logic circuit responsive to a respective modification in the interrogation signal to cease transmission of its own response signal. The response signals are transmitted at random intervals until the identity of a transponder is successfully read and acknowledged by the reader and placed into a dormant or gagged state. U.S. Pat. No. 5,699,066 (corresponding to EP0585132) and PCT application GB98/01385 (corresponding to WO/985142) also describe methods in which the response signals are transmitted at pseudo-random intervals. The whole contents of EP0585132 and WO/985142 are incorporated herein by reference.

Other examples of such methods are described in U.S. Pat. No. 5,699,096, US 2003067414 (corresponding to Cole WO 01/41043 A1), and Maletsky U.S. Pat. No. 6,104,279.

Methods have been used to improve the randomness of the response intervals. In U.S. Pat. No. 5,528,232, U.S. Pat. No. 5,640,151, U.S. Pat. No. 5,686,902 and U.S. Pat. No. 5,973,613 (all corresponding to EP 467036 B1), the whole contents of which are herein incorporated, the identification system uses a pseudo-random delay between transponder data transmissions. In this example, a linear recursive sequence generator is seeded by the transponder identification address to provide the pseudo-random delay between tag data transmissions. U.S. Pat. No. 5,550,547 describes a similar system in which the tag sends out a 64 bit ID code at intervals determined by a random number generator. U.S. Pat. No. 6,104,279 describes a system in which remote units re-transmit their bit pattern at random intervals. It further mentions that there are many techniques to produce a random number; for example the identification number can provide the seed for a random number generator permitting the user to individually seed each tag with a different random number.

Another method is based on slotted polling or slotted Aloha schemes in which tags randomly select a time slot in which to transmit and then transmit when it is their turn to do so. The theory is that because slots are randomly selected, sooner or later all tags will have had the opportunity to transmit messages 'in the clear'. WO 01/41043 describes such a system in which RFID tags randomly select a slot in which to transmit. In a practical implementation the slot selection by a tag is made on a pseudo-random basis, using a seed for a random number generator, which is derived from either part of the data held on the tag or by pre-programming a seed where the tag is manufactured. The possibility is great that many tags will have the same slot allocation choice. The fewer the number of slots to choose from, the greater will be the probability that many tags will 'randomly' select the same slot time and so will always collide and will therefore never be successfully read.

European patent EP0983569B1 the contents of which is included herein, describes an arbitration method similar to that in U.S. Pat. No. 5,537,105 with improvements in the form of a Mute command and functionality which provides a method of arbitration based on Carrier Sense Multiple Access (CSMA) as used in Aloha communications systems such as IEEE 802.11 and Ethernet. In this system, the interrogator listens for a first transmission from a first tag (transponder) and on detecting this first transmission the interrogator issues a Mute command which causes all other tags present in the field to freeze or go into a suspended condition while the interrogator completes reading the identity or data from the first tag. Once the first tag has completed its reply and the interrogator has successfully finished collecting the data, the interrogator issues an Acknowledge command to the first tag causing it to move to a quiet or sleep state, thereby removing it from the active tag population. After removing it the first tag from the population, the interrogator causes the tags in the suspended state to return to the active state, and it continues to collect data from these tags using the same process, until all tags have been successfully read and acknowledged. The command to return the remaining tags to the active state may either be combined with the Acknowledge command (as a single command) or it may be a separate command which is issued by the interrogator after it has sent the acknowledge to the first tag.

Another method described in used to improve the throughput of RFID systems using Aloha arbitration is by dynamically adjusting the maximum hold-off time or the number slots in an arbitration round. As congestion increases the maximum hold-off time is increased or number of slots is increased to permit more time for individual tags to reply. As the congestion decreases and there is unused airtime, the maximum hold-off time is decreased or the number of slots is decreased in order to maximise reading efficiency. U.S. Pat. No. 6,784,787 (corresponding to Patent Application WO99/26081), the whole of which is included herein by reference, describes a method and system for improving the reading efficiency of slotted systems by optimising the maximum waiting time before a tag (transponder) transmits or adjusts the number of slots over which a tag may randomly choose to transmit its reply. If there are too many tags in the field and the congestion is heavy, the maximum waiting time may be increased or the number of slots may be increased to relieve this congestion. The converse is also true; if there are few tags in the field and there is little or no congestion, the maximum waiting time may be decreased or the number of slots may be decreased in order to improve overall throughput. A Tag (Transponder) may dynamically alter the waiting time or number of slots over which it randomly transmits in response to an instruction from the interrogator. Alternatively, the tags (transponders) may be adapted to detect either heavy or light congestion and adjust their waiting time or slot number accordingly. Tags may increment or decrement their wait time or number of slots in increments in a number of stages or alter to any length for example number of clock pulses. The alteration of the waiting period imposes no limitation on the technique which may be used to determine the waiting time or number slots. When referring to time slots, a number of time slots are arranged in groups representing the maximum waiting time. These groups are usually referred to as Rounds. The number of time intervals contained within a maximum hold-off period can therefore be referred to as the Round Size.

A weakness of systems which attempt to arbitrate and read the identity or data in all tags present, is the need for the reader to systematically conduct an inventory and collect the data from all the tags present, whether their data or identity is required or not. For example in the case of a pallet load of goods; if the pallet contains a mixture of grocery items such as coffee, sugar, tinned foods and beer, and the reader wishes to conduct an inventory of only the beer, then it needs to conduct an inventory of the entire pallet, then on completing the inventory, discard the identities or data belonging to the unwanted items. This results in more "over the air" congestion than is necessary to take an inventory or collect data from the wanted tags and increases the read time proportional to the number of unwanted items (tags) present. In known systems, such as those described in the ISO/IEC 18000 air interface standard for item management, a number of methods are used to thin the population present so that arbitration can take place more quickly and efficiently. One such method is the "AFI" or Application Family Identifier". The arbitration initialisation command contains a parameter with an AFI value. Only those tags whose AFI matches the parameter will participate in the arbitration. This AFI parameter in the command is an 8 bit number of which only 16 values are available for item management, the balance being allocate to contactless smart cards. Another method uses specific "group select" commands, such as those described in the ANSI NCITS T6 standard, to systematically select groups or sub-groups of tags so that they may participate in the arbitration and identity or data collection process. The group selection mechanism requires the group identity to be held in a register on the tag. There is no provision in the select mechanism to exclude tags or groups of tags from the inventory process. Another group select mechanism is used in the Auto-ID Center EPC Class 1 air interface specification. In this specification, tags may be selected according to selection criteria which match a portion or all of the data on the tag. However with this method only one selection may be made per inventory process and there is also no means to exclude individual tags or groups of tags from the inventory process.

There are disadvantages to the known systems. One of these is the simplistic nature of the AFI, which only provides a very course or limited range of selection. Another disadvantage is the complex logic required on the transponders to accommodate group select mechanisms. One feature completely missing from known systems is the ability to exclude groups of transponders; in the example of the pallet of groceries discussed above this could be to exclude coffee and sugar while taking an inventory of all other items. Another problem with many known systems is the inability to select transponders for arbitration based on the data content held within the memory of the transponder itself or that the selection mechanism requires complex logic circuitry. Complex logic circuitry results in higher current consumption than simple logic, higher current consumption requires that the transponder have a larger DC storage capacitor resulting in a larger die area which directly impacts cost of the transponder. Higher current consumption also has the effect of reducing the communication range of the transponder which is disadvantageous to the user of the RFID system using these transponders.

EP 0702 323 A2 describes a method of communication with subsets of a group of RFID tags. The method has provision to move tags between a ready state and a selected state, and thereafter performing operations on the tag(s) which may be by way of arbitration or reading of identity or data from the tag(s). The selection mechanism employed in EP 0702 323 A2 changes the state of the tag's state machine requiring complex logic circuitry and the selection procedure is not versatile.

The present invention strives to at least alleviate many of the disadvantages of the known systems and provides a simple but powerful mechanism for selecting tags for arbitration. The present invention also strives to provide a far more versatile selection solution, that may be used with almost any type of state machine, from a simple one to a largely complex one.

SUMMARY OF THE INVENTION

In one aspect of the invention there is provided a method of selecting or de-selecting an individual transponder, or one or more groups of transponders, using one or more command signals from an interrogator, the transponder or transponders being within a field of interrogation, including the step of transmitting from the interrogator a command signal or signals, the or each of which includes selection or de-selection criteria whereby if a transponder meets the selection or de-selection criteria it determines the condition of a flag, said condition of the flag being used to determine one or more subsequent operations of the transponder.

The selection or de-selection criteria in the command signals may take the form of data for comparison with data stored in the memory or memories of the transponder or transponders whereby the transponder or transponders set or reset a select flag dependent on whether they are to be selected or de-selected.

In one embodiment if the data in the transponder memory corresponds to that sent by the command signal, the transponder is either selected or de-selected dependent on the setting of the select flag in the transponder. Alternatively, the flag can be inverted so that if the data in the transponder memory does not correspond to that sent by the command signal, the transponder may be either selected or de-selected dependent on the setting of the select flag in the transponder.

In one embodiment the select flag is connected to one or more logic gates which together define selection logic circuitry of the transponder. The flag is in the form of a bistable or flip-flop, the flag determining whether the transponder should respond to a Query command from the interrogator or participate in an arbitration sequence or not.

In one embodiment if the select flag is set, the transponder will reply to a Query command or if not set, will not reply to a Query command. Alternatively, if the select flag is not set, the transponder may be adapted to participate in an arbitration sequence or reply to a Query command.

The select flag can serve as an exclusion mechanism, whereby groups or sub-groups of transponders may be excluded from the arbitration sequence using this same select flag as part of the determination mechanism.

Preferably the selection or de-selection of an individual transponder, or group or groups of transponders, uses a number of commands with parameters to address a population of transponders using any content of the transponder memory as a target selection field.

The selection process may be undertaken either as part of an arbitration process or as an independent process.

In one embodiment the selection process allows individual or groups of transponders to be selected, excluded or a combination of selection and exclusion using just one command with a settable/resettable exclude flag. The one command is a select command the parameters of which allow one or more transponders to be placed in a selected condition or removed from the selected condition according to a selection mask which is compared with a portion or all of the memory contents stored on the or each transponder.

One feature of a preferred embodiment is the provision of a connect command which is used to address an individual transponder or a group of transponders in order to conduct a dialogue with it or them in the case of multiple transponders. A Query command may also be used to allow the interrogator to query the population present for the presence of any transponders which have met the selection criteria. In addition, an acknowledge command may be used to acknowledge the successful completion of an arbitration sequence or completion of a dialogue with a transponder. There is also provided provide a singulate command which is used during an arbitration sequence to place an individual transponder into a state whereby a dialogue may be conducted with it.

In another aspect of the invention there is provided a transponder comprising logic circuitry responsive to a command signal from an interrogator, whereby if the transponder meets selection or de-selection criteria in the command signal it is selected or deselected. If a transponder meets the selection or de-selection criteria it determines the condition of a flag, said condition of the flag being used to determine one or more subsequent operations of the transponder.

In a preferred embodiment the transponder has a memory, a select flag and a comparator for comparing data in the command signal with data in the memory, whereby the transponder sets or resets the select flag dependent on whether it is to be selected or de-selected. If the data in the transponder memory does not correspond to that sent by the command signal, the transponder is either selected or de-selected dependent on the setting of the select flag in the transponder; or if the data in the transponder memory does correspond to that sent by the command signal, the transponder is still selected or deselected dependent on the setting of the select flag.

In a further aspect of the invention there is provided an identification system comprising an interrogator and a plurality of transponders, the interrogator including a transmitter for transmitting selection or de-selection criteria in one or more command signals to select or de-select an individual transponder, or one or more groups of transponders, each transponder including a receiver for receiving the command signal or signals and logic circuitry responsive to the command signal or signals, whereby if the transponder meets selection or de-selection criteria in the command signal or signals it is selected or deselected. If a transponder meets the selection or de-selection criteria it determines the condition of a flag, said condition of the flag being used to determine one or more subsequent operations of the transponder.

In one embodiment the selection or de-selection criteria is in the form of data in the command signal or signals, the data to be compared with data in a memory or memories of the transponder or transponders within a field of interrogation, whereby the transponder or transponders set or reset a select flag dependent on whether they are to be selected or de-selected. Other embodiments of the identification system include features of the transponder defined in the transponder claims included hereinafter.

In yet a further aspect of the invention there is provided an integrated circuit for use in a transponder including a receiver for receiving a command signal from an interrogator, comprising logic circuitry responsive to a command signal from the interrogator whereby if the integrated circuit meets selection or de-selection criteria in the command signal it is selected or deselected. If the integrated circuit meets the selection or de-selection criteria it determines the condition of a flag, said condition of the flag being used to determine one or more subsequent operations of the transponder.

Embodiments of the integrated circuit include features defined in the integrated circuit claims included hereinafter.

In a further aspect of the invention there is provided a method of identifying a plurality of transponders comprising transmitting a reader signal from a reader, receiving the reader signal in each transponder, recognising in the reader a transponder signal transmitted from a transponder and issuing a mute instruction from the reader muting all other transponders and passing control to said transponder, the muting instruction causing the other transponder or transponders to have moved from an ACTIVE state to a STANDBY state where their wait cycle between transmissions has been suspended, and transmitting an Acknowledge instruction from the reader after the controlling transponder signal has been successfully received by the reader, the Acknowledge instruction causing the transponder that has been read to move to a QUIET state and causing the other transponder or transponders to move from their STANDBY state back to the ACTIVE state.

In one embodiment a transponder moving between the ACTIVE state and the STANDBY state has a member flag set to suspend their random wait cycle, and their member flag is reset when moving from the STANDBY state to the ACTIVE state.

In another aspect of the invention there is provided an identification system comprising a reader including a transmitter for transmitting a reader signal, and a plurality of transponders, each transponder including a receiver for receiving the reader signal and a transmitter for generating a transponder signal, whereby upon recognising a transponder signal from a said transponder the reader issues a mute instruction, muting all other active transponders and passing control to the said transponder, the muting instruction causing the other transponder or transponders to have moved from an Active state to a Standby state where their wait cycle between transmissions has been suspended, the reader issues an Acknowledge instruction after the controlling transponder signal has been successfully received by the reader, the Acknowledge instruction causing the transponder that has been read to move to a Quiet state and causing the other transponder or transponders to move from their Standby state back to the Active state.

In one embodiment of the identification system a transponder moving between the Active state and the Standby state has a member flag set to suspend their random wait cycle, and their member flag is reset when moving from the Standby state to the Active state to continue their random wait cycle.

The selecting or de-selecting of an individual, or one or more groups of transponders, can move them from a powered up Ready state to the Active state. Embodiments of the identification system include the features of transponders defined in any one of the transponder claims incorporated hereinafter below.

In another aspect of the invention there is provided a transponder responsive to a muting instruction causing the transponder to move from an Active state to a Standby state where its wait cycle between transmissions has been suspended, the transponder being responsive to an Acknowledge instruction causing the transponder to move from its Standby state back to the Active state. The transponder when in the Active state is responsive to an Acknowledge instruction from the reader to move the transponder from the Active state to a Quiet state.

In another aspect of the invention there is provided an integrated circuit wherein the circuit is responsive to a muting instruction causing the circuit to move from an Active state to a Standby state where its wait cycle between transmissions has been suspended, the circuit being responsive to an Acknowledge instruction causing the circuit to move from its Standby state back to the Active state. The integrated circuit when in the Active state is responsive to an Acknowledge instruction from the reader to move the circuit from the Active state to a Quiet state.

In a further aspect of the invention there is provided a reader for identifying a plurality of transponders, the reader comprising a transmitter for transmitting a command signal or signals to the transponders, the command signal or signals including selection or de-selection criteria to select or de-select an individual transponder, or one or more groups of transponders, whereby the transponder or transponders set or reset a select flag dependent on whether they are to be selected or de-selected.

In yet a further aspect of the invention a reader is provided comprising a transmitter for transmitting a reader signal to a plurality of transponders, each transponder including a receiver for receiving the reader signal and a transmitter for generating a transponder signal, whereby the reader upon recognising a transponder signal from a said transponder is adapted to issue a mute instruction, muting all other active transponders and passing control to the said transponder, the muting instruction causing the other transponder or transponders to have moved from an Active state to a Standby state where their wait cycle between transmissions has been suspended, the reader also being adapted to issue an Acknowledge instruction after the controlling transponder signal has been successfully received by the reader, the Acknowledge instruction causing the transponder that has been read to move to a Quiet state and causing the other transponder or transponders to move from their Standby state back to the Active state.

DESCRIPTION OF THE DRAWINGS

The invention will be described further, by way of examples, with reference to and as illustrated in the accompanying drawings, in which

FIG. 5 is a table of the tag states with their description and the commands to which they are responsive;

FIG. 6 is a table describing the arbitration command operations;

DESCRIPTION OF THE INVENTION

This invention provides a system, method and circuit for a selection mechanism for selecting or deselecting a group or sub-group of RFID transponders present in the reading field of an RFID Interrogator. The selection mechanism is greatly simplified compared with the known selection methods used in RFID systems of known art. The selection mechanism described here is implemented using a small number of IC gates and does not require registers or pointers to hold the selection or group selection criteria. It also provides a versatile selection mechanism allowing the selection or exclusion of single or multiple tags from arbitration making use of a single 'Selected' flag on the transponder, which flag is either set or reset depending on the commands. This selection mechanism provides a low complexity selection which considerably reduces the number of transistors needed, which in turn reduces both chip area and the DC power requirements. By reducing the DC power requirements the required DC storage capacitance may be reduced in size which in turn reduces the area required for the chip. A major benefit to reducing the DC power requirements is the increase in operating range of the transponder. It will be appreciated that reducing chip area brings about a commensurate reduction in fabrication costs and therefore favourably impacts the cost to the end user.

The selection mechanism of this invention is particularly suited to RFID as it applies to item identification or management as envisaged by the retail supply industry. In this industry which includes Consumer Goods Manufacturing, a variety of numbering systems is used to identify goods. One of the most common identifiers is the EAN.UCC "GTIN" or Global Trade Identification Number. The GTIN allows an object class to be uniquely identified, for example; Variety A of baked beans made by Company XYZ. The GTIN only provides information on the object class but it does not provide information about the specific instance of that class. A new numbering system called EPC for Electronic Product Code, similar to a GTIN but also carrying a serial number is being in development. The EPC permits a specific instance of an item to be uniquely identified. There will be various versions of EPC, however all versions have similar data structures. A typical EPC will have four fields. Starting with the most significant bit these fields are Header, EPC Manager, Object Class and Serial Number. The Header describes the format of the data and provides additional information about the code. The EPC manager refers to the specific manager of the object class and serial number, this usually being the manufacturer of the item to which the EPC is attached. The object class describes the object and the serial number the specific instance of that object. If we refer back to the example of a pallet of groceries containing cartons of tins of coffee, bags of sugar, several boxes of tinned food of which specific items are peas, tomatoes and curry and several cases of bottled beer. This pallet arrives from the distribution centre at the inwards loading dock of a Supermarket. The Goods Receiving Clerk wishes to take an inventory of the pallet before breaking bulk in order to verify the manifest. Because the pallet contains different object classes, some of which are canned goods, some of which are semi-perishable and some which are alcoholic, he needs to separately inventory each class. Some of the items come from different manufacturers making the EPC manager different between the items. The Clerk could take an inventory using the selection mechanism, selecting by EPC manager for the tinned goods but he wants to exclude from the inventory the coffee which has the same EPC manager as the tinned goods. The first step in the selection process would be to select all those items having the wanted EPC manager. A second selection step would then be done, but this time the selection will be a negative selection ie an exclusion, on the object class referring to the coffee. This will permit the interrogator to take an inventory of all the tinned goods even those having a different object classes such as peas, tomatoes and curry. Once this inventory has been performed further selections may be made to include or exclude items using any of the stored data.

The select mechanism uses a number of commands with parameters to address a population of transponders using any content of the transponder memory as a target selection field.

The selection process may be undertaken either as part of the arbitration process or as an independent process. The process allows individual or groups of tags to be selected, excluded or a combination of selection and exclusion using just one command with a settable/resettable exclude flag. Overall five commands are used to undertake selection and dialogue between the interrogator and the transponder/s.

These commands perform specific functions, the names in this description are used to illustrative purposes only. The names used in this description are general command names which may or may not have different functions in other protocols. The commands described herein are: Select, Connect, Query, Acknowledge and Singulate. The Select together with its parameters allow one or more tags to be placed in a selected condition or removed from the selected condition according to a selection mask which is compared with a portion or all of the memory contents stored on the transponder. The Connect command is used to address an individual transponder or a group of transponders in order to conduct a dialogue with it or them in the case of multiple transponders.

The Query command allows the Interrogator to query the population present for the presence of any transponders which have met the selection criteria. The Acknowledge command is used to acknowledge the successful completion of an arbitration sequence of completion of a dialogue with a transponder. The Singulate command is used during an arbitration sequence to place an individual transponder into a state whereby a dialogue may be conducted with it. There may be other commands used to arbitrate a population of transponders present or conduct a dialogue with specific transponders such as reading from and writing to transponders, however these will not be discussed in this specific instance.

The transponder incorporates a memory which may be organised in blocks or pages or in a single uninterrupted memory block. The memory may be accessed by means of a shift register which allows the memory contents to be clocked in or out as desired. The memory may also be accessed by parallel means. The transponder further incorporates a 'Selected' flag in the form of a bistable or flip-flop. This flag is used by the transponder to determine whether it should respond to a Query command or participate in an arbitration sequence or not. If this flag is set, then the transponder will reply to a Query or if not set, then it will not reply to a Query. This invention also provides a means by which a transponder whose 'Selected' flag is not set, to participate in an arbitration sequence or reply to a Query command. In other words the operation of the flag may be inverted or reversed. Furthermore, this invention further permits the selection flag to act as an exclusion mechanism, whereby groups or sub-groups of transponders may be excluded from the arbitration sequence using this same 'Selected' flag as part of the determination mechanism. It can be seen that this invention with the aid of a small set of commands from interrogator to transponder permits an extremely versatile selection mechanism. This mechanism may also be used for transponder population thinning, whereby the population present in the interrogator field may be effectively reduced by rendering a proportion of the transponders invisible to the interrogator. The Selected flag is referred to as the "S" flag and indicates whether a transponder is a member of a selected population.

The Select command forms the basis of the selection mechanism of this invention; it has several parameters. The first two parameters are an Exclude flag and a New flag. The next parameter is a Pointer that points to the position in the transponder memory from where the selection comparison will start. The next two parameters are a Mask Length and a Mask Value. The Mask Length specifies the number of memory bits which will be compared and the Mask Value specifies the actual data value which will be compared to the data value in transponder memory.

The Query command contains a Select Flag as a parameter. When this bit is high any transponder whose 'Selected' flag is set will reply and transponder's whose 'Selected' flag is not set will not reply. When this bit is low, any transponder whose 'Selected' flag is not set will reply and any transponder whose 'Selected' flag is set will not reply.

Figure 1:
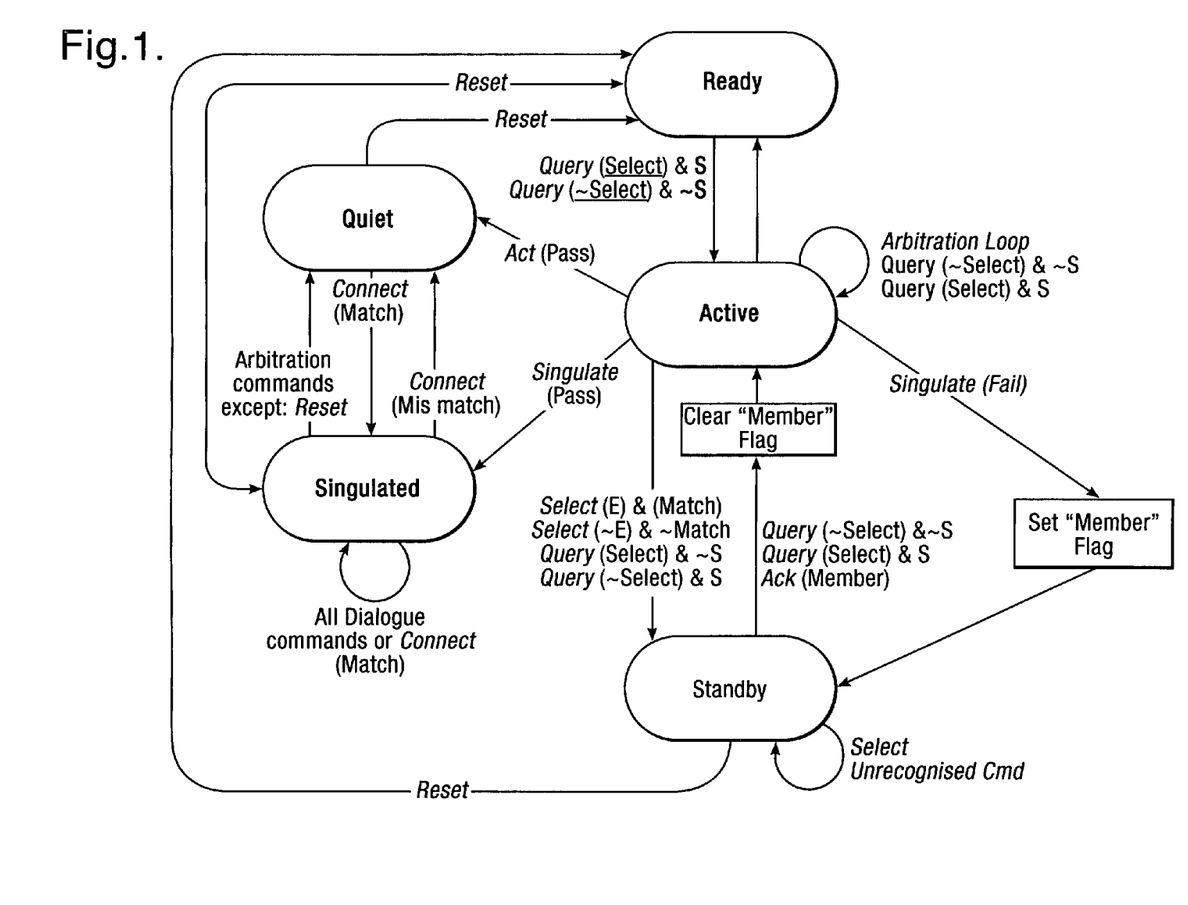
FIG. 1 shows a state transition diagram for a typical RFID transponder incorporating one embodiment of a select mechanism which is the subject of this invention.
Figure 2:
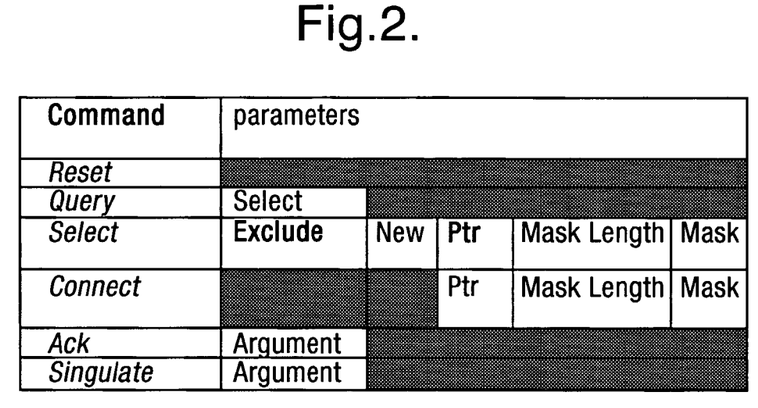
FIG. 2 shows the format of the commands used to implement the select mechanism of FIG. 1 in accordance with an embodiment of this invention.

FIG. 1 shows a simplified state diagram for an RFID transponder using the invention. Transponders start in the Ready state on power up. By default all transponders power up 'Selected' (ie. 'S' flag set). The Interrogator may issue a Query command at any time. If it is desired to select a group of transponders to conduct and inventory from those present, the Interrogator may issue one or more Select commands.

When the Exclude bit in the Select command is low all transponders whose memory data match the selection mask will cause their 'S' flag to be set. All other transponders (ie those whose memory data do not match) will cause their 'S' flags to be reset. The select process may be repeated as many times as is necessary to refine the selected group. All transponders whose memory data match the selection mask will cause their 'S' flag to be set, all other transponders (ie those whose memory data to not match) will cause their 'S' flags to be reset.

When the Exclude bit in the Select command is high, all transponders whose memory data match the selection mask will cause their 'S' flags to be reset. All other transponders (ie those whose memory data do not match) will cause their 'S' flags to retain their Selected condition.

When the New bit in the Select command is high, all transponders whose memory data match the selection mask will cause their 'S' flags to be set.

When the interrogator issues a Query command with the Select bit high, all transponders whose 'S' flag is set move into the Active (arbitration) state and they participate in the inventory process. All transponders whose 'S' flag is not set remain in the Ready state. As transponders are successfully read by the interrogator, the interrogator issues an Acknowledge (Ack) command which removes the specific transponder from the Active state so that it no longer participates in the inventory process (because it no longer needs to). A transponder on receiving a Query command whose selection criteria do not match will move to the Standby state.

The Connect command operates in a similar manner except that it is an immediate command and causes the transponder whose select bit is in the appropriate state to move to a Singulated state so that it may participate in a dialogue with the interrogator.

The Singulate command has two possible outcomes depending on whether the command argument meets the criteria of a transponder. If the Singulate command argument passes, the transponder will move from the Active state to the Singulated state. If however the Singulate command argument fails, then the transponder will move to a Standby state (ie it will be parked). A flag called a Member flag will be set to indicate its parked status.

A Query command whose selection criteria match or an Acknowledge command will cause the transponders in the Standby state to return to the Active state and to reset the Member flag if it had been previously set so that transponders that had been parked to return to the active state without affecting the condition of their 'S' flags.

It will be appreciated that this state diagram refers to one possible implementation of the invention. Other implementations are possible.

Figure 3:
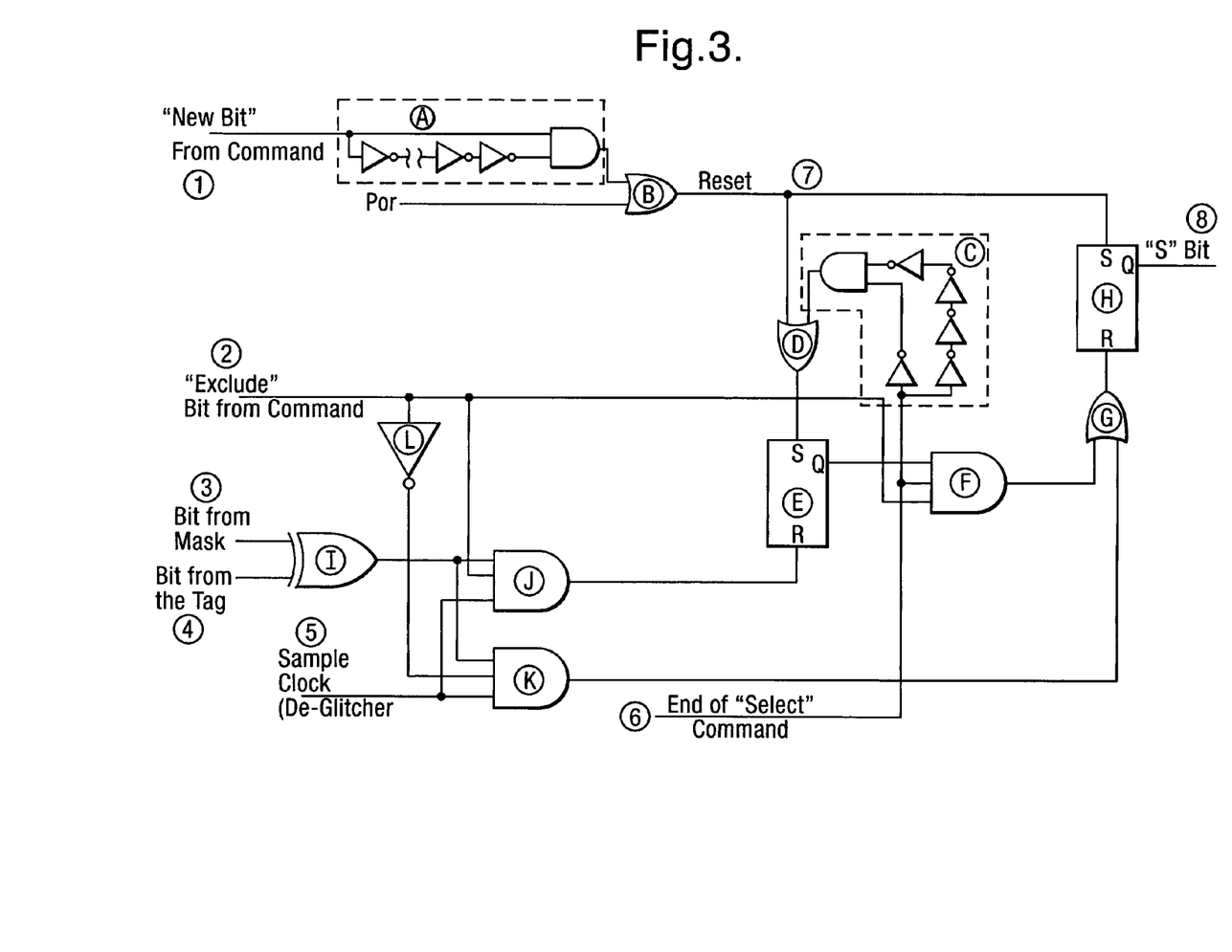
FIG. 3 shows an embodiment of a circuit which implements the select mechanism and select flag.

The detail of one embodiment of the transponder Selection/Exclude mechanism will now be described by means of one possible embodiment with reference to FIG. 3.

1. Flip-Flop H stores the "S" flag, which indicates whether a tag is a member of the selected population.
2. The "S" flag is set upon power up by means of the POR signal which results in all new entrants into a tag population being in the selected population by default.
3. Signal 6 indicates the end of a Select command by means of a short pulse. This signal is normally low causing the output of AND gate F to remain low.
4. Signal 5 is a clock signal that is taken high a short interval after the Bit from the Mask (signal 3) and the Bit from the Tag (signal 4) are presented to Exclusive OR gate I for comparison.
5. Signal 2 indicates whether a SELECTION or an EXCLUSION operation are being performed by being in the low state for SELECTION and in the high state for EXCLUSION.
6. If a SELECTION is being performed, then the output of AND gate K will go high if the data bit from the Tag (signal 4) does not match the data bit from the Mask (signal 3). If they do match, however, the output of AND gate K will remain low. The output of AND gate J will remain low during a SELECTION operation.
7. If the output of AND gate K goes high due to a mismatch during a SELECTION operation, the output of Flip-Flop H will be reset (the "S" bit) and the tag will no longer be a member of the selected population.
8. If, however, the output of AND gate K remains low during the entire SELECTION operation, the output of Flip-Flop H will remain high (the "S" bit) and the tag will remain a member of the selected population.
9. Any number of such SELECTION operations can be performed in sequence comparing with different portions of the tags memory whether these are contiguous or separated. This results in an effective ANDing of the selections. These operations can be performed immediately following each other or separated by significant time intervals.
10. Flip-Flop E stores the Exclusion flag, which is used to temporarily indicate that a tag is a member of the group to be excluded from the previously selected population.
11. The Exclusion flag, is set upon power up by means of the POR signal and at the end of each Select command by means of circuit C which generates a short reset signal for Flip-Flop E at the falling edge of the End of Select Command signal 6.
12. If a EXCLUSION is being performed, then the output of AND gate J will go high if the data bit from the Tag (signal 4) does not match the data bit from the Mask (signal 3). If they do match, however, the output of AND gate J will remain low. The output of AND gate K will remain low during a EXCLUSION operation.
13. If the output of AND gate J goes high due to a mismatch during a EXCLUSION operation, the output of Flip-Flop E will be reset (the Exclusion flag) and the current EXCLUSION operation will be unsuccessful.
14. If, however, the output of AND gate J remains low during the entire EXCLUSION operation, the output of F Flip-Flop E will remain high (the Exclusion flag) and the current EXCLUSION operation will be successful.
15. At the end of the current EXCLUSION operation, the End of Select Command signal 6. will go high to indicate the end of the command. Because signal 2 (the "Exclude" bit from the command) is high, the output of AND gate F will go high if the output of Flip-Flop E (the Exclusion flag) is high. This will, in turn, cause the output of the OR gate G to go high thus resetting the output of Flip-Flop H (the "S" bit) and the tag will no longer be a member of the selected population.
16. If the output of Flip-Flop E (the Exclusion flag) is low at the end of the current EXCLUSION operation, the output of AND gate F will remain low resulting in the output of the OR gate G remaining low and the tag will not be removed from the selected population although it may have been removed by a previous operation.
17. Any number of such EXCLUSION operations can be performed in sequence comparing with different portions of the tags memory whether these are contiguous or separated. This results in an effective ORing of the EXCLUSIONS. These operations can be performed immediately following each other or separated by significant time intervals.

Tag Sub-Population Selection

The Select command as already referred to above provides a mechanism for the reader to select groups of tags for arbitration and reading. It has a number of parameters:

Exclude control bit
when='0' causes the tags having a matching mask to be included in the selection by setting the 'S' flag in the tag.
When='1' causes the tags having a matching mask to be excluded from the selection by clearing the 'S' flag in the tag.

New control bit—is used to begin a new selection process without interfering with a tag which has previously been acknowledged and placed in the quiet state.

Reply speed—Sets the tag reply (return link) data rate.

Page—Allows the tag to have as many as 4 different memory pages and for each of these memory pages to be individually addressed.

Pointer—points the the position in memory at which a comparison will start.

Mask Length—specifies the length of the comparison mask data

Mask Value—comparison mask data.

The Selection mechanism allows the tag to be included or excluded from arbitration depending on the condition of the Exclude control bit in the Select command parameters.

A number of successive Select commands may be issued to a tag to refine the selection process. These successive Select commands may be either include or exclude commands and may be applied to any portion of the tag memory, whether continuous or fragmented. Successive Inclusive Select commands are effectively ANDed whereas exclude Select commands are ORed. The condition of the 'S' flag is used to determine whether a tag participates in an arbitration sequence or not.

On entering an RF Field, the tag will perform a Power On Reset (POR). The POR resets the tag to a known condition and also causes the 'S' (Selected flag) to be set. Subsequent Select commands will alter the condition of this flag. The 'S' flag is used to determine whether the tag participates in an arbitration sequence or not depending on the Select parameter in the Query command.

If the Select parameter in the Query command is=1 and the 'S' flag is set then the tag will participate in an arbitration sequence. If the 'S' flag is not set, then the tag will remain in the Ready state, or if it was previously in the Active state it will move to the Standby state and set a "member" flag to remember that it is in a suspended condition.

If the Select parameter in the Query command is='0' and the 'S' flag is NOT set, then the tag will participate in an arbitration sequence. If the 'S' flag is set, then the tag will remain in the Ready state, or if it was previously in the Active state it will move to the Standby state and set a "member" flag to remember that it is in a suspended condition.

This allows the population to be "thinned", thus increasing the effective read rate achieved. Because only Tags of interest to the application will be selected, any other Tags in the Reader field will not degrade Reader performance by needing to be read and acknowledged to send them to the QUIET state—they are effectively transparent to the reader if they have not been selected.

The selection capabilities also allow the Tag population to be "Tree-Walked" allowing fully "Deterministic" arbitration of a Tag population. By adding more and more bits to the selection criteria, the population can be resolved down to a single Tag.

Figure 4:
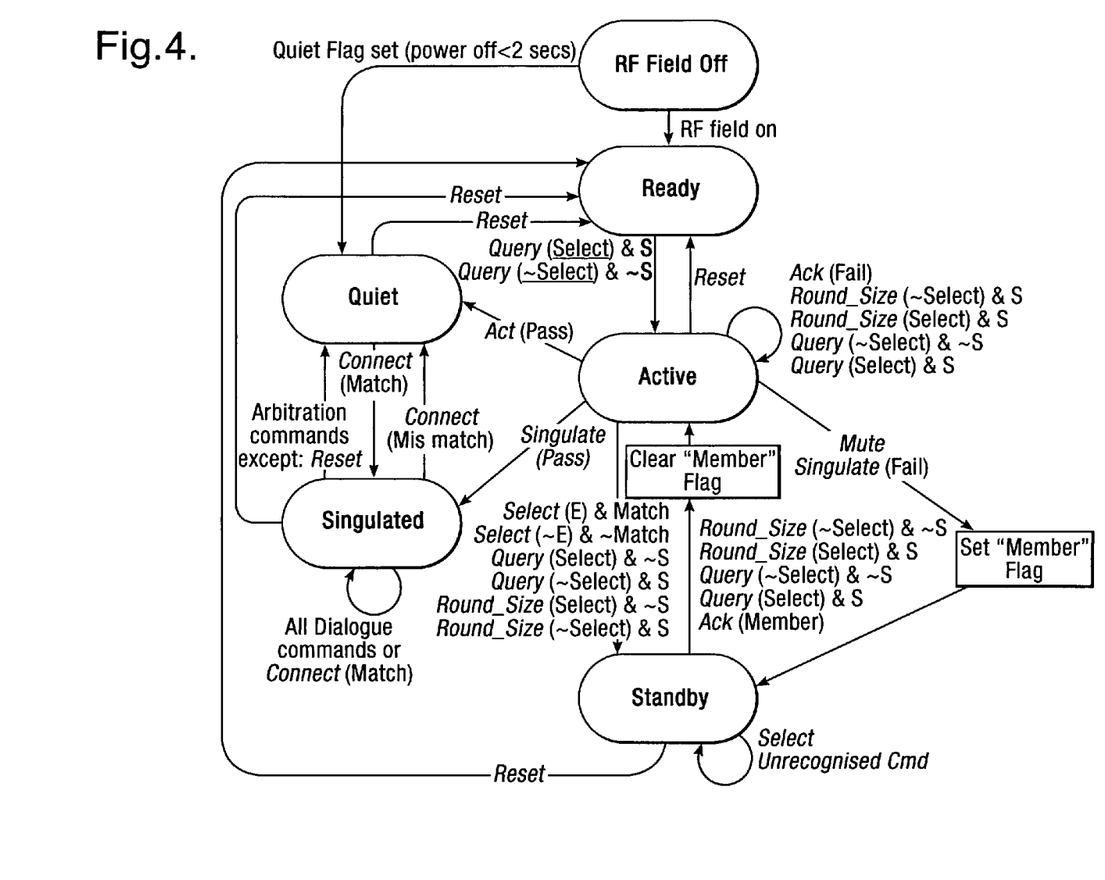
FIG. 4 shows a state transition diagram for a typical RFID transponder incorporating a second embodiment of a select mechanism for use with the anti-collision protocol described in EP0983569B1.
Figure 7:
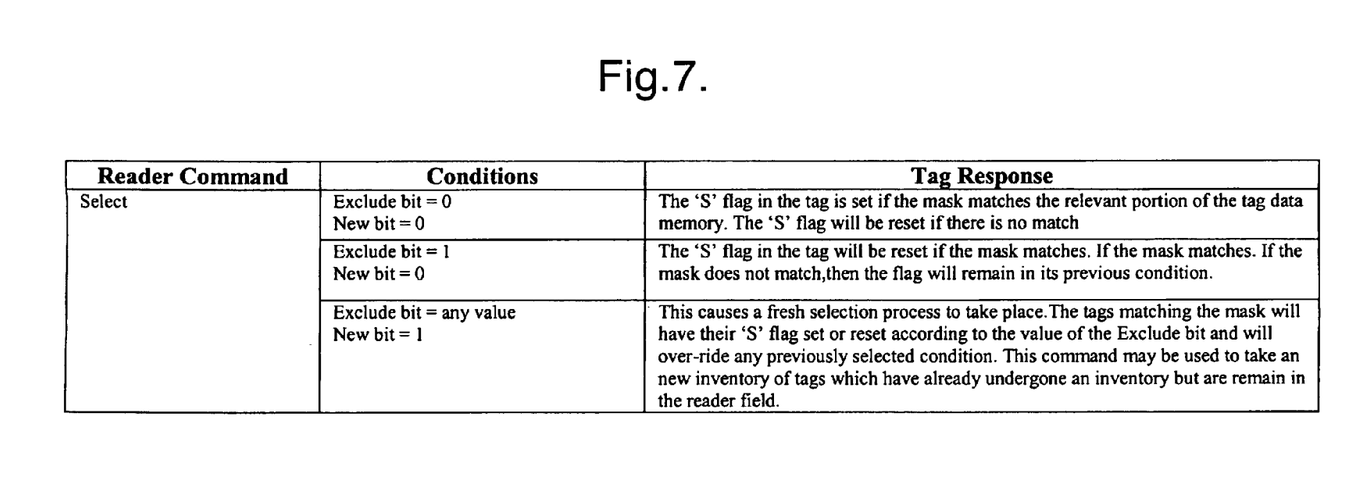
FIG. 7 is a table describing the select command operation.

The state transition diagram of FIG. 4 is similar to the state diagram of FIG. 1. It differs in that it includes the functionality to implement the collision arbitration anti-collision protocol known as Fast Supertag™. The methods and systems describing the Supertag™ and the Fast Supertag™ anti-collision protocols are described in U.S. Pat. No. 5,537,105, U.S. Pat. No. 5,557,280 and EP0983569B1, the whole contents of which are incorporated herein by reference.

Referring to FIG. 4 once a tag is in the Active state, one way in which it will move to the Standby state, is by the issue of a "mute" instruction, which causes it to set a "member" flag to remember that it is in a suspended condition. This "mute" instruction can arise by implementation of the Fast Supertag™ anti-collision protocol which will be described briefly below.

The Fast Supertag™ anti-collision method can make use of pseudo-slots which are timed by the tags. They are called pseudo-slots because their duration is insufficient for a tag to transmit a complete message (reply) to the reader but instead are of sufficient duration to accommodate the preamble preceding data transmission.

Fast Supertag™ collision arbitration is a method and system for singulating and reading populations of RFID tags. It is based on a Random Hold-off and Retry with Switch-off scheme commonly known as Aloha arbitration with switch-off. What distinguishes Fast Supertag™ from other slotted Aloha RFID systems is the 'mute' feature which operates in a similar manner to 'carrier sense before transmit' in Carrier Sense Multiple Access (CMSA) Aloha systems. In Aloha and other slotted RFID systems, if more than one tag transmits in a slot or time interval, a collision occurs and both/all transmissions are lost. In Fast counting Supertag™ the reader causes only one tag to transmit at a time, thereby avoiding collisions between tag transmissions and therefore improving tag reading throughput by a factor of 2 to 3 times and almost completely eliminating lost time due to collisions.

The operation in accordance with an embodiment of this invention will be described more fully with reference to FIGS. 4, 5 and 8

A reader initiates a read cycle by issuing a Query command. Tags begin a "hold-off and retry" cycle. In this cycle a random number generator on the tag selects a wait period of random duration before transmitting its message (or selects a time slot at random in which to transmit).

The clocks in the tags start running and a pseudo-random number generator produces a random wait cycle (or random slot selection).

Figure 8:
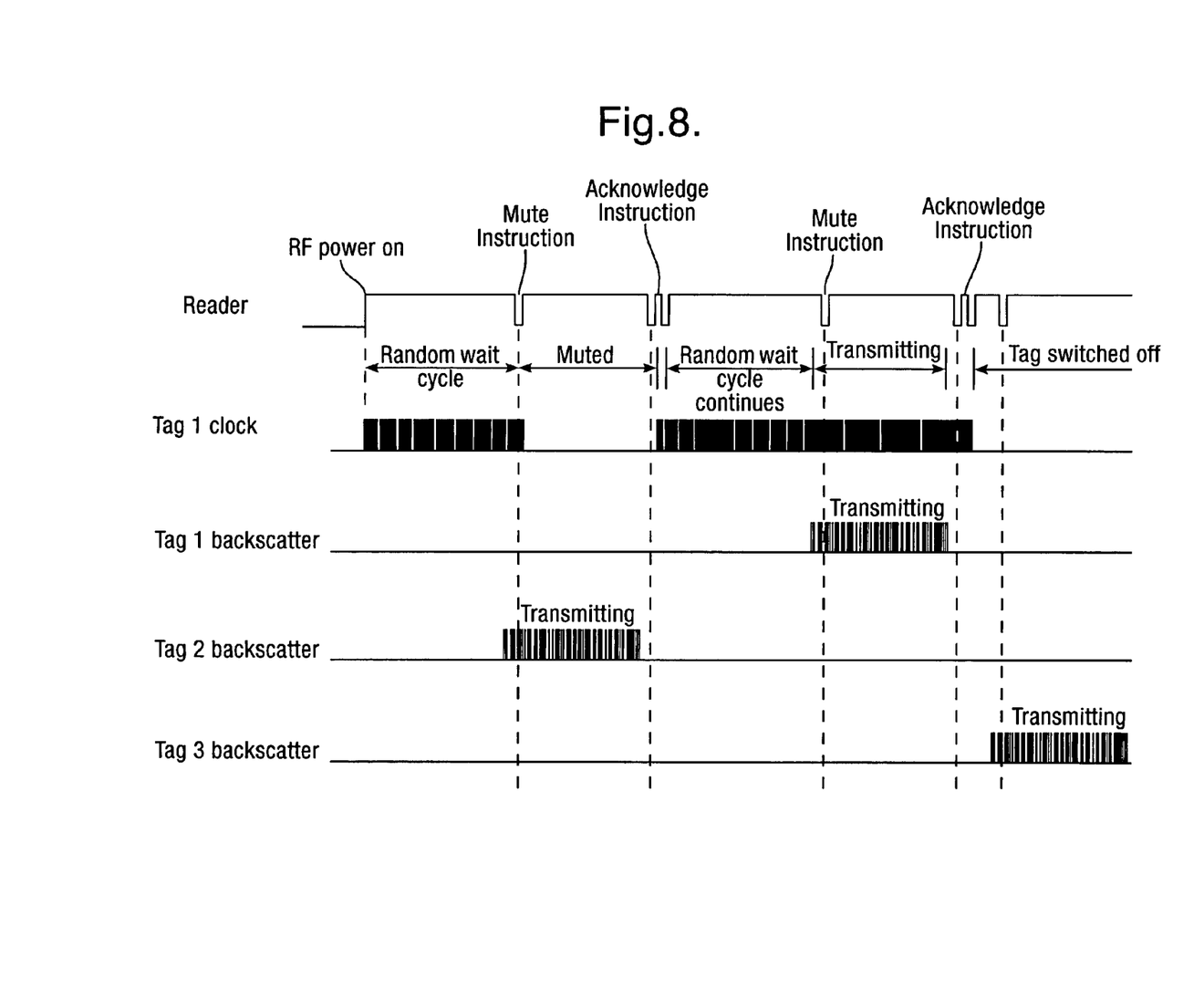
FIG. 8 is a timing diagram for a transponder operating in accordance with one embodiment of the Fast Supertag™ anti-collision protocol described in EP0983569B1

Referring to FIG. 8, tag 2 has selected a short wait time (the first slot) and starts to transmit first. The reader, on detecting tag 2 preamble, transmits a Mute instruction to the tag population. This instruction is received by all tags except tag 2 which is already transmitting and therefore cannot receive the instruction. The Mute instruction causes tags not transmitting to suspend their random wait cycle by entering a STANDBY state.

More specifically, with reference to FIG. 4 the other tags 1 and 3, which have also been in the Active state, receive the Mute instruction, which causes them to set a "member" flag to remember that they are in a suspended condition.

When tag 2 has finished transmitting its message and if the reader has successfully received the message, the reader sends an Acknowledge instruction to tag 2 which causes tag 2 to enter a sleep (or switch-off) state so that it no longer participates in the arbitration. In FIG. 4 this is shown as the QUIET state. This Acknowledge instruction is also received by [other] tags in the STANDBY state which causes these tags to clear the "Member" flag and to go back into the ACTIVE state to re-start the random wait cycle.

Tag 1 is the next tag to transmit its message. Again the reader sends a Mute instruction to the population and when tag 1 has finished transmitting its message and the reader has successfully received it, the reader sends an Acknowledge instruction switching off tag 1 and causing the rest of the population to again re-start the random wait cycle. Tag 3 is the next tag to transmit its message, and so the process continues until all tags present have been read.

It will be appreciated that this circuit describes one possible embodiment and that one skilled in the art would be able to arrive at other embodiments based on the mechanism described above. For example, the flag may desirably be a single cell or single bit memory which can be volatile or nonvolatile such as a simple flip flop or bi-stable circuit. Flags using more complex circuitry may also be employed without detracting from the selection versatility of the invention.

That which is claimed:

1. A method of selecting or de-selecting one or more groups of transponders, using a selection process comprising one or more select commands from an interrogator, the one or more groups of transponders being within a field of interrogation, the method comprising:
transmitting from the interrogator a select command that includes selection or de-selection criteria of the one or more groups of transponders, whereby if a transponder meets selection or de-selection criteria in the select command, the transponder is selected or deselected while remaining in a first state; and
transmitting from the interrogator at least one arbitration command, wherein the at least one arbitration command comprises a select parameter,
wherein transponders within the one or more groups of transponders participate in an arbitration sequence, by transitioning from the first state to a second state to transmit a reply, in response to the at least one arbitration command and in an instance in which the transponder is selected and the select parameter is set to selected, and
wherein transponders within the one or more groups of transponders participate in an arbitration sequence, by transitioning from the first state to a second state to transmit a reply, in response to the at least one arbitration command and in an instance in which the transponder is deselected and the set parameter is set to deselected.

2. A method of selecting or de-selecting one or more groups of transponders, using a selection process comprising one or more select commands from an interrogator, the one or more groups of transponders being within a field of interrogation, the method comprising:
transmitting from the interrogator a select command that includes data for comparison with data stored in the memories of a transponder within the one or more groups of transponders, whereby the transponder or transponders within the one or more groups of transponders set or reset a select flag dependent on whether they are to be selected or de-selected while remaining in a first state; and
transmitting from the interrogator at least one arbitration command, wherein the at least one arbitration command comprises a select parameter,
wherein the transponder or transponders within the one or more groups of transponders participate in an arbitration sequence, by transitioning from the first state to a second state to transmit a reply, in response to the at least one arbitration command and in an instance in which the select flag is set and the select parameter is set to selected, and
wherein the transponder or transponders within the one or more groups of transponders participate in an arbitration sequence, by transitioning from the first state to a second state to transmit a reply, in response to an arbitration command and in an instance in which the select flag is reset and the set parameter is set to deselected.

3. A method as claimed in claim 2, wherein if the data in the transponder memory corresponds to that sent by the select command, the transponder is either selected or de-selected dependent on the setting of the select flag in the transponder.

4. A method as claimed in claim 2, wherein if the data in the transponder memory does not correspond to that sent by the select command, the transponder is either selected or de-selected dependent on the setting of the select flag in the transponder.

5. A method as claimed in claim 2, wherein the select flag is connected to one or more logic gates which together define selection logic circuitry of the transponder.

6. A method as claimed in claim 2, wherein the select flag is in the form of a bistable or flip-flop, the select flag determining whether the transponder should respond to an arbitration command comprising a Query command from the interrogator or participate in an arbitration sequence or not.

7. A method as claimed in claim 6, wherein if the select flag is set, the transponder will reply to the Query command, or if not set, will not reply to the Query command.

8. A method as claimed in claim 6, wherein if the select flag is not set, the transponder is adapted to participate in an arbitration sequence or reply to a Query command.

9. A method as claimed in claim 2, wherein the select flag serves as an exclusion mechanism, whereby one or more groups of transponders may be excluded from the arbitration sequence using this same select flag as part of a determination mechanism.

10. A method as claimed in claim 2, wherein the selection or de-selection of one or more groups of transponders, uses a number of commands with parameters to address one or more groups of transponders using any content of the transponder memory as a target selection field.

11. A method as claimed in claim 1 wherein the selection process is undertaken either as part of an arbitration process or as an independent process.

12. A method as claimed in claim 1, wherein the selection process allows one or more groups of transponders to be selected, excluded or a combination of selection and exclusion using one command with a settable/resettable exclude flag.

13. A method as claimed in claim 12, wherein said one command is a select command the parameters of which allow one or more groups of transponders within the one or more groups of transponders to be placed in a selected condition or removed from the selected condition according to a selection mask which is compared with a portion or all of the memory contents stored on the one or more groups of transponders.

14. A method as claimed in claim 12, wherein said arbitration command is a connect command used to address one or more groups of transponders within the one or more groups of transponders in order to conduct a dialogue.

15. A method as claimed in claim 12, wherein said arbitration command is a Query command used to allow the interrogator to query the one or more groups of transponders for the presence of any transponders which have met the selection criteria.

16. A method as claimed in claim 12, wherein said arbitration command is an acknowledge command used to acknowledge the successful completion of an arbitration sequence of completion of a dialogue with a transponder.

17. A method as claimed in claim 13, wherein said arbitration command is a singulate command used during an arbitration sequence to place an individual transponder into a state whereby a dialogue may be conducted with it.

18. A transponder comprising logic circuitry responsive to a select command from an interrogator, whereby if the transponder meets selection or de-selection criteria in the select command it is selected or deselected, wherein the transponder is configured to participates in an arbitration sequence, in response to an arbitration command that comprises a select parameter, wherein the transponder participates in the arbitration sequence in an instance in which it is selected and the select parameter is set to selected and wherein the transponder participates in the arbitration is sequence in an instance in which it is deselected and the select parameter is set to deselected.

19. A transponder as claimed in claim 18, wherein the transponder has a memory, a select flag and a comparator for comparing data in the select command with data in the memory, whereby the transponder sets or resets the select flag dependent on whether it is to be selected or de-selected.

20. A transponder as claimed in claim 19, wherein if the data in the transponder memory does not correspond to that sent by the select command, the transponder is either selected or de-selected dependent on the setting of the select flag in the transponder; or if the data in the transponder memory does correspond to that sent by the select command, the transponder is still selected or deselected dependent on the setting of the select flag.

21. A transponder as claimed in claim 19, wherein the select flag is connected to one or more logic gates which together define selection logic circuitry of the transponder.

22. A transponder as claimed in claim 19, wherein the select flag is in the form of a bistable or flip-flop, the select flag determining whether the transponder should respond to an arbitration command comprising a Query command from the interrogator or participate in an arbitration sequence or not.

23. A transponder as claimed in claim 19, wherein if the select flag is set, the transponder will reply to a Query command or if not set, will not reply to a Query command.

24. A transponder as claimed in claim 19, wherein if the select flag is not set, the transponder is adapted to participate in an arbitration sequence or reply to a Query command.

25. A transponder as claimed in claim 19, wherein the select flag serves as an exclusion mechanism, whereby groups or sub-groups of transponders may be excluded from participation in the arbitration sequence using this same select flag as part of a determination mechanism.

26. A transponder as claimed in claim 19, wherein a settable/resettable exclude flag is provided whereby the selection process can select individual or groups of transponders to be selected, excluded or a combination of selection and exclusion using just one command.

27. A transponder as claimed in claim 26, said arbitration command is the select command, the parameters of which allows the transponder to be placed in a selected condition or removed from the selected condition according to a selection mask which is compared with a portion or all of the memory contents stored on the transponder.

28. A transponder as claimed in claim 26, wherein the transponder is responsive to the arbitration command wherein said arbitration command is a connect command which is used to address one or more transponders within the one or more groups of transponders.

29. A transponder as claimed in claim 26, wherein the transponder is responsive to the arbitration command wherein said arbitration command is a Query command which is used to allow the interrogator to query the one or more groups of transponders for the presence of any transponders which have met the selection criteria.

30. A transponder as claimed in claim 29, wherein the transponder is responsive to the arbitration command wherein said arbitration command is an acknowledge command which is used to acknowledge the successful completion of an arbitration sequence or completion of a dialogue with a transponder.

31. A transponder as claimed in claim 30, wherein the transponder is responsive to the arbitration command wherein said arbitration command is a singulate command which is used during an arbitration sequence to place an individual transponder into a state whereby a dialogue may be conducted with it.

32. An identification system comprising an interrogator and a plurality of transponders, the interrogator including a transmitter for transmitting selection or de-selection criteria in one or more commands to select or de-select one or more groups of transponders and at least one arbitration command comprising a select parameter, each transponder within the one or more groups of transponders including a receiver for receiving the one or more commands and logic circuitry responsive to the commands, whereby if the transponder meets selection or de-selection criteria in the commands it is selected or deselected while remaining in a first state, wherein the transponder participates in an arbitration sequence, by transitioning from the first state to a second state to transmit a reply, in an instance in which the transponder is selected and the select parameter is set to selected and wherein the transponder participates in an arbitration sequence, by transitioning from the first state to a second state to transmit a reply, in an instance in which the transponder is deselected and the select parameter is set to deselected.

33. An identification system as claimed in claim 32, wherein the selection or de-selection criteria is in the form of data in one or more select commands, the data to be compared with data in a memory or memories of the one or more groups of transponders within a field of interrogation, whereby each transponder within the one or more groups of transponders set or reset a select flag dependent on whether they are to be selected or de-selected.

34. An integrated circuit for use in a transponder including a receiver for receiving a select command from an interrogator, the integrated circuit further comprising logic circuitry responsive to a select command from the interrogator whereby if the integrated circuit meets selection or de-selection criteria in the select command it is selected or deselected while remaining in a first state; and the integrated circuit participates in an arbitration sequence, by transitioning from the first state to a second state to transmit a reply, in response to an arbitration command comprising a select parameter and in an instance in which the integrated circuit is selected and the select parameter is set to selected and wherein the integrated circuit participates in an arbitration sequence, by transitioning from the first state to a second state to transmit a reply, in response to an arbitration command and in an instance in which the integrated circuit is deselected and the select parameter is set to deselected.

35. An integrated circuit as claimed in claim 34, comprising a memory, a select flag and a comparator for comparing data in the select command with data in the memory, whereby the circuitry sets or resets the select flag dependent on whether it is to be selected or de-selected.

36. An integrated circuit as claimed in claim 35, wherein if the data in the memory does not correspond to that sent by the select command, the integrated circuit is either selected or de-selected dependent on the setting of the select flag in the integrated circuit; or if the data in the memory does correspond to that sent by the select command, the integrated circuit is still selected or deselected dependent on the setting of the select flag.

37. A plurality of transponders, each of which is as claimed in claim 19, wherein the selection or de-selection of an individual transponder, or group of transponders, uses a selection process comprising a number of commands with parameters to address a population of transponders using any content of the transponder memory as a target selection field.

38. An integrated circuit as claimed in claim 35, wherein the select flag is connected to one or more logic gates which together define selection logic circuitry of the integrated circuit.

39. An integrated circuit as claimed in claim 35, wherein the select flag is in the form of a bistable or flip-flop, the select flag determining whether the transponder should respond to the arbitration command comprising a Query command from the interrogator or participate in an arbitration sequence or not.

40. An integrated circuit as claimed in claim 35, wherein if the select flag is set, the transponder will reply to the Query command, or if the select flag is not set, will not reply to the Query command.

41. An integrated circuit as claimed in claim 35, wherein if the select flag is not set, the transponder is adapted to participate in an arbitration sequence or reply to the Query command.

42. An integrated circuit as claimed in claim 35, wherein the select flag serves as an exclusion mechanism, whereby one or more groups of transponders may be excluded from an the arbitration sequence using this same select flag as part of a determination mechanism.

43. An integrated circuit as claimed in claim 35, wherein a settable/resettable exclude flag is provided whereby the selection process can select individual or groups of transponders to be selected, excluded or a combination of selection and exclusion using just one command.

44. An integrated circuit as claimed in claim 43, wherein said one command is the select command, the parameters of which allow the transponder to be placed in a selected condition or removed from the selected condition according to a selection mask which is compared with a portion or all of the memory contents stored on the integrated circuit.

45. An integrated circuit as claimed in claim 44, wherein the integrated circuit is responsive to the arbitration command, the arbitration command being a connect command which is used by the interrogator to address one or more groups of transponders in order to conduct a dialogue.

46. An integrated circuit as claimed in claim 45, wherein the integrated circuit is responsive to the arbitration command, the arbitration command being a Query command which is used to allow the interrogator to query the one or more groups of transponders for the presence of any transponders which have met the selection criteria.

47. An integrated circuit as claimed in claim 46, wherein the integrated circuit is responsive to the arbitration command, the arbitration command being an acknowledge command which is used to acknowledge the successful completion of an arbitration sequence of completion of a dialogue with the a transponder.

48. An integrated circuit as claimed in claim 47, wherein the integrated circuit is responsive to the arbitration command, the arbitration command being a singulate command which is used during an arbitration sequence to place an individual transponder into a state whereby a dialogue may be conducted with it.

49. A method as claimed in claim 3, wherein transmitting the select command from the interrogator is performed prior to a transmission of the arbitration command, the select command being independent from the arbitration command and wherein the arbitration command includes an indication of a select flag, such that the transponder is adapted to participate in an arbitration sequence if the select flag on the transponder matches the select flag in the arbitration command.

* * * * *